US008494135B2

(12) United States Patent
Rajagopalan et al.

(10) Patent No.: US 8,494,135 B2
(45) Date of Patent: Jul. 23, 2013

(54) METHODS AND SYSTEMS FOR CONTACT MANAGEMENT

(75) Inventors: Mahesh Rajagopalan, Irving, TX (US); Ruchir Rodrigues, Irving, TX (US); Shadman Zafar, Coppell, TX (US); Shamik Basu, Irving, TX (US); Aravind Perumandla, Irving, TX (US); Anil Solleti, Irving, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 1530 days.

(21) Appl. No.: 10/720,784

(22) Filed: Nov. 24, 2003

(65) Prior Publication Data

US 2005/0157858 A1    Jul. 21, 2005

Related U.S. Application Data

(63) Continuation-in-part of application No. 10/083,793, filed on Feb. 27, 2002, which is a continuation-in-part of application No. 10/083,792, filed on Feb. 27, 2002, which is a continuation-in-part of application No. 10/083,884, filed on Feb. 27, 2002, which is a continuation-in-part of application No. 10/083,822, filed on Feb. 27, 2002.

(60) Provisional application No. 60/428,704, filed on Nov. 25, 2002, provisional application No. 60/436,018, filed on Dec. 26, 2002, provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*H04M 3/42* (2006.01)
*H04M 1/56* (2006.01)
*H04M 15/06* (2006.01)
*H04M 1/00* (2006.01)
*H04M 3/00* (2006.01)

(52) U.S. Cl.
USPC ............ 379/201.01; 379/142.04; 379/355.02; 379/355.04

(58) Field of Classification Search
USPC ............. 379/201.01, 355.04, 201.04, 142.15, 379/142.17, 355.05, 218.01, 355.02, 142.04; 707/1, 200; 709/104.1; 455/445, 415, 414.1
See application file for complete search history.

(56) References Cited

U.S. PATENT DOCUMENTS

| 4,013,839 A | 3/1977 | Bell |
| 4,540,850 A | 9/1985 | Herr et al. ................. 379/88.19 |

(Continued)

FOREIGN PATENT DOCUMENTS

| CA | 2240878 | 12/1998 |
| EP | 0818908 | 1/1998 |

(Continued)

OTHER PUBLICATIONS

"The Mobile Phone User Guide", http://www.mobileshop.org/usertech/wildfire.htm, printed Oct. 1, 2004.

(Continued)

*Primary Examiner* — Thjuan K Addy

(57) ABSTRACT

Systems and methods are provided for performing contact management services. Systems and methods may maintain one or more address books. Contacts may be added to the address book from one or more sources. Systems and method may receive a command to add a party to the address book. Contact-related information associated with the party may obtained and added to the address book. A user may be notified of an incoming call placed by a calling party and destined to a communication device associated with the user. Systems and methods may receive a command, responsive to the notification, to add the calling party to an address book associated with the user. An address book may be updated to reflect changes in the contact-related information.

34 Claims, 9 Drawing Sheets

U.S. PATENT DOCUMENTS

| | | | |
|---|---|---|---|
| 4,600,814 A | 7/1986 | Cunniff et al. | |
| 4,924,496 A | 5/1990 | Figa et al. | |
| 5,014,303 A | 5/1991 | Velius | |
| 5,168,515 A | 12/1992 | Gechter et al. | |
| 5,222,125 A | 6/1993 | Creswell et al. | |
| 5,274,700 A | 12/1993 | Gechter et al. | |
| 5,327,486 A | 7/1994 | Wolff et al. | 379/93.23 |
| 5,329,578 A | 7/1994 | Brennen et al. | |
| 5,428,663 A | 6/1995 | Grimes et al. | |
| 5,440,624 A | 8/1995 | Schoof | |
| 5,483,586 A | 1/1996 | Sussman | |
| 5,533,096 A | 7/1996 | Bales | |
| 5,535,265 A | 7/1996 | Suwandhaputra | |
| 5,548,636 A | 8/1996 | Bannister et al. | |
| 5,550,907 A | 8/1996 | Carlsen | |
| 5,583,564 A | 12/1996 | Rao et al. | |
| 5,586,173 A | 12/1996 | Misholi et al. | |
| 5,588,037 A | 12/1996 | Fuller et al. | |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,649,105 A | 7/1997 | Aldred et al. | |
| 5,652,789 A | 7/1997 | Miner et al. | 379/201 |
| 6,718,178 B1 | 7/1997 | Miner et al. | |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,712,903 A | 1/1998 | Bartholomew et al. | |
| 5,715,444 A | 2/1998 | Danish et al. | |
| 5,717,863 A | 2/1998 | Adamson et al. | |
| 5,719,925 A | 2/1998 | Peoples | |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,745,884 A | 4/1998 | Carnegie et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,018,571 A * | 1/2000 | Langlois et al. | 379/201.04 |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,078,658 A | 6/2000 | Yunoki | |
| 6,100,882 A | 8/2000 | Sharman et al. | |
| 6,122,348 A | 9/2000 | French-St. George et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,654,768 B2 | 2/2001 | Celik | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,260,050 B1 | 7/2001 | Yost et al. | |
| 6,275,575 B1 | 8/2001 | Wu | |
| 6,282,522 B1 | 8/2001 | Davis et al. | |
| 6,296,082 B1 | 10/2001 | Gardell et al. | |
| 6,298,129 B1 | 10/2001 | Culver et al. | |
| 6,301,338 B1 | 10/2001 | Makela et al. | |
| 6,301,609 B1 | 10/2001 | Aravamudan et al. | 709/207 |
| 6,310,939 B1 | 10/2001 | Varney | |
| 6,310,947 B1 | 10/2001 | Polcyn | 379/211.01 |
| 6,324,269 B1 | 11/2001 | Malik | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,092,102 A1 | 4/2002 | Lefeber et al. | |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,404,873 B1 | 6/2002 | Beyda et al. | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,590,603 B2 | 7/2003 | Sheldon et al. | |
| 6,590,969 B1 | 7/2003 | Peters et al. | |
| 6,593,352 B2 | 7/2003 | Smith | |

| Patent | Date | Inventor(s) | Ref |
|---|---|---|---|
| 6,594,470 B1 | 7/2003 | Barnes et al. | |
| 6,600,736 B1 | 7/2003 | Ball et al. | |
| 6,609,113 B1 | 8/2003 | O'Leary et al. | |
| 6,611,590 B1 | 8/2003 | Lu et al. | |
| 6,614,786 B1 | 9/2003 | Byers | 370/353 |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,631,186 B1 | 10/2003 | Adams et al. | |
| 6,636,587 B1 | 10/2003 | Nagai et al. | |
| 6,643,356 B1 | 11/2003 | Hickey et al. | |
| 6,661,340 B1 | 12/2003 | Saylor et al. | |
| 6,665,388 B2 | 12/2003 | Bedingfield | |
| 6,668,046 B1 | 12/2003 | Albal | |
| 6,668,049 B1 | 12/2003 | Koch et al. | |
| 6,681,119 B1 | 1/2004 | Verdonk | |
| 6,683,939 B1 | 1/2004 | Chiloyan et al. | |
| 6,687,362 B1 * | 2/2004 | Lindquist et al. | 379/218.01 |
| 6,690,672 B1 | 2/2004 | Klein | |
| 6,693,897 B1 | 2/2004 | Huang | |
| 6,697,461 B1 | 2/2004 | Middleswarth et al. | |
| 6,697,796 B2 | 2/2004 | Kermani | |
| 6,704,294 B1 | 3/2004 | Cruickshank | |
| 6,711,158 B1 | 3/2004 | Kahane et al. | |
| 6,717,938 B1 | 4/2004 | D'Angelo | |
| 6,718,026 B1 | 4/2004 | Pershan et al. | |
| 6,724,887 B1 | 4/2004 | Eilbacher et al. | |
| 6,731,238 B2 | 5/2004 | Johnson | |
| 6,735,292 B1 | 5/2004 | Johnson | |
| 6,738,458 B1 | 5/2004 | Cline et al. | |
| 6,744,861 B1 | 6/2004 | Pershan et al. | |
| 6,747,970 B1 | 6/2004 | Lamb et al. | |
| 6,748,054 B1 | 6/2004 | Gross et al. | |
| 6,757,365 B1 | 6/2004 | Bogard | |
| 6,768,788 B1 | 7/2004 | Langseth | |
| 6,768,790 B1 | 7/2004 | Manduley et al. | |
| 6,771,949 B1 | 8/2004 | Corliss | |
| 6,775,267 B1 | 8/2004 | Kung et al. | |
| 6,775,546 B1 | 8/2004 | Fuller | |
| 6,788,772 B2 | 9/2004 | Barak et al. | |
| 6,788,775 B1 | 9/2004 | Simpson | |
| 6,792,092 B1 | 9/2004 | Michalewicz | |
| 6,798,753 B1 | 9/2004 | Doganata et al. | |
| 6,801,610 B1 | 10/2004 | Malik | |
| 6,807,258 B1 | 10/2004 | Malik | |
| 6,807,259 B1 | 10/2004 | Patel et al. | |
| 6,816,468 B1 | 11/2004 | Cruickshank | |
| 6,816,469 B1 | 11/2004 | Kung et al. | |
| 6,820,055 B2 | 11/2004 | Saindon et al. | |
| 6,842,460 B1 | 1/2005 | Olkkonen et al. | |
| 6,847,823 B2 | 1/2005 | Lehikoinen et al. | |
| 6,853,634 B1 | 2/2005 | Davies et al. | |
| 6,853,713 B1 * | 2/2005 | Fobert et al. | 379/142.17 |
| 6,856,974 B1 | 2/2005 | Ganesan et al. | |
| 6,876,632 B1 | 4/2005 | Takeda | |
| 6,876,736 B2 | 4/2005 | Lamy et al. | |
| 6,882,714 B2 | 4/2005 | Mansfield | |
| 6,882,838 B1 | 4/2005 | Lee et al. | |
| 6,885,742 B1 | 4/2005 | Smith | |
| 6,907,111 B1 | 6/2005 | Zhang et al. | |
| 6,917,610 B1 | 7/2005 | Kung et al. | |
| 6,944,279 B2 | 9/2005 | Elsey et al. | |
| 6,947,538 B2 | 9/2005 | Shen et al. | |
| 6,954,521 B2 | 10/2005 | Bull et al. | |
| 6,954,524 B2 | 10/2005 | Gibson | |
| 6,956,942 B2 * | 10/2005 | McKinzie et al. | 379/355.04 |
| 6,958,984 B2 | 10/2005 | Kotzin | |
| 6,961,409 B2 | 11/2005 | Kato | |
| 6,963,857 B1 | 11/2005 | Johnson | |
| 6,970,705 B2 | 11/2005 | Yoshimoto et al. | |
| 6,996,227 B2 * | 2/2006 | Albal et al. | 379/355.05 |
| 6,996,370 B2 | 2/2006 | DeLoye et al. | |
| 6,999,563 B1 | 2/2006 | Thorpe et al. | |
| 7,024,209 B1 | 4/2006 | Gress et al. | |
| 7,027,435 B2 | 4/2006 | Bardehle | |
| 7,031,437 B1 | 4/2006 | Parsons et al. | |
| 7,043,521 B2 | 5/2006 | Eitel | |
| 7,065,198 B2 | 6/2006 | Brown et al. | |
| 7,068,768 B2 * | 6/2006 | Barnes | 379/142.15 |
| 7,076,528 B2 | 7/2006 | Premutico | |
| 7,099,288 B1 | 8/2006 | Parker et al. | |
| 7,107,312 B2 | 9/2006 | Hackbarth et al. | |
| 7,116,972 B1 | 10/2006 | Zhang et al. | |
| 7,127,050 B2 | 10/2006 | Walsh et al. | |
| 7,130,390 B2 | 10/2006 | Abburi | |
| 7,139,728 B2 | 11/2006 | Rigole | |
| 7,139,782 B2 | 11/2006 | Osaki | |
| 7,142,646 B2 | 11/2006 | Zafar et al. | |
| 7,149,773 B2 | 12/2006 | Haller et al. | |
| 7,155,001 B2 | 12/2006 | Tiliks et al. | |
| 7,174,306 B1 | 2/2007 | Haseltine | |
| 7,181,417 B1 | 2/2007 | Langseth et al. | |
| 7,187,932 B1 * | 3/2007 | Barchi | 455/445 |
| 7,190,773 B1 | 3/2007 | D'Silva et al. | |
| 7,209,955 B1 | 4/2007 | Major et al. | |
| 7,212,808 B2 | 5/2007 | Engstrom et al. | |
| 7,245,929 B2 | 7/2007 | Henderson et al. | |
| 7,254,220 B1 | 8/2007 | Reding et al. | |
| 7,254,643 B1 | 8/2007 | Peters et al. | |
| 7,283,808 B2 | 10/2007 | Castell et al. | |
| 7,289,489 B1 | 10/2007 | Kung et al. | |
| 7,308,087 B2 | 12/2007 | Joyce et al. | |
| 7,315,614 B2 | 1/2008 | Bedingfield et al. | |
| 7,379,538 B1 | 5/2008 | Ali et al. | |
| 7,418,090 B2 | 8/2008 | Reding et al. | |
| 7,428,580 B2 | 9/2008 | Hullfish et al. | |
| 7,546,337 B1 | 6/2009 | Crawford | |
| 7,616,747 B2 | 11/2009 | Wurster et al. | |
| 7,912,193 B2 | 3/2011 | Chingon et al. | |
| 2001/0003202 A1 | 6/2001 | Mache et al. | |
| 2001/0012286 A1 | 8/2001 | Huna et al. | |
| 2001/0014863 A1 | 8/2001 | Williams, III | |
| 2001/0017777 A1 | 8/2001 | Maruyama et al. | |
| 2001/0025262 A1 | 9/2001 | Ahmed | |
| 2001/0025280 A1 | 9/2001 | Mandato et al. | |
| 2001/0032181 A1 | 10/2001 | Jakstadt et al. | |
| 2001/0039191 A1 | 11/2001 | Maierhofer | |
| 2001/0040954 A1 | 11/2001 | Brachman et al. | |
| 2001/0043689 A1 | 11/2001 | Malik | |
| 2001/0043690 A1 | 11/2001 | Bakshi et al. | |
| 2001/0043691 A1 | 11/2001 | Bull et al. | |
| 2001/0051534 A1 | 12/2001 | Amin | |
| 2001/0054066 A1 | 12/2001 | Spitzer | |
| 2001/0056466 A1 | 12/2001 | Thompson et al. | |
| 2002/0012425 A1 | 1/2002 | Brisebois et al. | |
| 2002/0018550 A1 | 2/2002 | Hafez | |
| 2002/0022453 A1 | 2/2002 | Balog et al. | |
| 2002/0026575 A1 | 2/2002 | Wheeler et al. | |
| 2002/0035617 A1 | 3/2002 | Lynch et al. | |
| 2002/0040355 A1 | 4/2002 | Weiner | |
| 2002/0046299 A1 | 4/2002 | Lefeber et al. | |
| 2002/0055351 A1 | 5/2002 | Elsey et al. | |
| 2002/0057678 A1 | 5/2002 | Jiang et al. | |
| 2002/0062251 A1 | 5/2002 | Anandan et al. | |
| 2002/0064268 A1 | 5/2002 | Pelletier | |
| 2002/0069060 A1 | 6/2002 | Cannavo et al. | |
| 2002/0069096 A1 | 6/2002 | Lindoerfer et al. | |
| 2002/0071539 A1 | 6/2002 | Diament et al. | |
| 2002/0073163 A1 | 6/2002 | Churchill et al. | |
| 2002/0075303 A1 | 6/2002 | Thompson et al. | |
| 2002/0075306 A1 | 6/2002 | Thompson et al. | |
| 2002/0076022 A1 | 6/2002 | Bedingfield | |
| 2002/0076026 A1 | 6/2002 | Batten | |
| 2002/0076027 A1 | 6/2002 | Bernnan et al. | |
| 2002/0077082 A1 | 6/2002 | Cruickshank | |
| 2002/0078153 A1 | 6/2002 | Chung et al. | |
| 2002/0080942 A1 | 6/2002 | Clapper | 379/201.01 |
| 2002/0082028 A1 | 6/2002 | Wittenkamp | |
| 2002/0082030 A1 | 6/2002 | Berndt et al. | |
| 2002/0083462 A1 | 6/2002 | Arnott | 348/14.08 |
| 2002/0085515 A1 | 7/2002 | Jaynes et al. | |
| 2002/0085687 A1 | 7/2002 | Contractor et al. | |
| 2002/0085701 A1 | 7/2002 | Parsons et al. | |
| 2002/0100798 A1 | 8/2002 | Farrugia et al. | |
| 2002/0103864 A1 | 8/2002 | Rodman et al. | |
| 2002/0103898 A1 | 8/2002 | Moyer et al. | |
| 2002/0110121 A1 | 8/2002 | Mishra | 370/389 |

| | | | |
|---|---|---|---|
| 2002/0115471 A1 | 8/2002 | DeLoye et al. | |
| 2002/0122545 A1 | 9/2002 | Schwab et al. | |
| 2002/0126817 A1 | 9/2002 | Hariri et al. | |
| 2002/0128025 A1 | 9/2002 | Sin | |
| 2002/0128033 A1 | 9/2002 | Burgess | |
| 2002/0137507 A1 | 9/2002 | Winkler | |
| 2002/0137530 A1 | 9/2002 | Karve | |
| 2002/0138468 A1 | 9/2002 | Kermani | |
| 2002/0146105 A1 | 10/2002 | McIntyre | |
| 2002/0147777 A1 | 10/2002 | Hackbarth et al. | |
| 2002/0147811 A1 | 10/2002 | Schwartz et al. | 709/225 |
| 2002/0152165 A1 | 10/2002 | Dutta et al. | |
| 2002/0154210 A1 | 10/2002 | Ludwig et al. | |
| 2002/0168055 A1 | 11/2002 | Crockett et al. | |
| 2002/0177410 A1 | 11/2002 | Klein et al. | |
| 2002/0178117 A1 | 11/2002 | Maguire et al. | |
| 2003/0005150 A1 | 1/2003 | Thompson et al. | |
| 2003/0014488 A1 | 1/2003 | Dalal et al. | |
| 2003/0035381 A1 | 2/2003 | Chen et al. | |
| 2003/0036380 A1 | 2/2003 | Skidmore | |
| 2003/0045309 A1 | 3/2003 | Knotts | |
| 2003/0046071 A1 | 3/2003 | Wyman et al. | |
| 2003/0053612 A1 | 3/2003 | Henrikson et al. | |
| 2003/0055735 A1 | 3/2003 | Cameron et al. | |
| 2003/0055906 A1 | 3/2003 | Packham et al. | |
| 2003/0058838 A1 | 3/2003 | Wengrovitz | 370/352 |
| 2003/0063732 A1 | 4/2003 | Mcknight et al. | |
| 2003/0069874 A1 | 4/2003 | Hertzog et al. | |
| 2003/0083040 A1 | 5/2003 | Ruth et al. | |
| 2003/0092451 A1 | 5/2003 | Holloway et al. | |
| 2003/0093700 A1 | 5/2003 | Yoshimoto et al. | |
| 2003/0096626 A1 | 5/2003 | Sabo et al. | |
| 2003/0097635 A1 | 5/2003 | Giannetti | |
| 2003/0104827 A1 | 6/2003 | Moran et al. | |
| 2003/0108172 A1 | 6/2003 | Petty et al. | |
| 2003/0112928 A1 | 6/2003 | Brown et al. | |
| 2003/0112952 A1 | 6/2003 | Brown et al. | |
| 2003/0119532 A1 | 6/2003 | Hatch | |
| 2003/0140004 A1 | 7/2003 | O'Leary et al. | |
| 2003/0142798 A1 | 7/2003 | Gavette et al. | |
| 2003/0147518 A1 | 8/2003 | Albal et al. | |
| 2003/0149662 A1 | 8/2003 | Shore | |
| 2003/0158860 A1* | 8/2003 | Caughey | 707/200 |
| 2003/0165223 A1 | 9/2003 | Timmins et al. | |
| 2003/0167229 A1 | 9/2003 | Ludwig et al. | |
| 2003/0169330 A1 | 9/2003 | Ben-Shachar et al. | |
| 2003/0179743 A1 | 9/2003 | Bosik et al. | |
| 2003/0179864 A1 | 9/2003 | Stillman et al. | |
| 2003/0187992 A1 | 10/2003 | Steenfeldt et al. | |
| 2003/0208541 A1 | 11/2003 | Musa | |
| 2003/0217097 A1 | 11/2003 | Eitel | |
| 2003/0228863 A1 | 12/2003 | Vander Veen et al. | |
| 2004/0002350 A1 | 1/2004 | Gopinath et al. | |
| 2004/0002902 A1 | 1/2004 | Muehlhaeuser | |
| 2004/0019638 A1 | 1/2004 | Makagon et al. | 709/204 |
| 2004/0034700 A1 | 2/2004 | Polcyn | |
| 2004/0037409 A1 | 2/2004 | Crockett et al. | |
| 2004/0044658 A1 | 3/2004 | Crabtree et al. | |
| 2004/0052356 A1* | 3/2004 | McKinzie et al. | 379/355.02 |
| 2004/0081292 A1 | 4/2004 | Brown et al. | |
| 2004/0103152 A1 | 5/2004 | Ludwig et al. | |
| 2004/0119814 A1 | 6/2004 | Clisham et al. | |
| 2004/0127256 A1 | 7/2004 | Goldthwaite et al. | |
| 2004/0156491 A1 | 8/2004 | Reding et al. | |
| 2004/0184593 A1 | 9/2004 | Elsey et al. | |
| 2004/0203942 A1 | 10/2004 | Dehlin | |
| 2004/0208305 A1 | 10/2004 | Gross et al. | |
| 2004/0236792 A1* | 11/2004 | Celik | 707/104.1 |
| 2004/0247088 A1 | 12/2004 | Lee | |
| 2004/0249884 A1 | 12/2004 | Caspi et al. | |
| 2004/0264654 A1 | 12/2004 | Reding et al. | |
| 2005/0053206 A1 | 3/2005 | Chingon et al. | |
| 2005/0053221 A1 | 3/2005 | Reding et al. | |
| 2005/0102382 A1 | 5/2005 | MacGregor et al. | |
| 2005/0117714 A1 | 6/2005 | Chingon et al. | |
| 2005/0129208 A1 | 6/2005 | McGrath et al. | |
| 2005/0149487 A1* | 7/2005 | Celik | 707/1 |
| 2005/0191994 A1 | 9/2005 | May et al. | |
| 2005/0216421 A1 | 9/2005 | Barry et al. | |
| 2005/0220286 A1 | 10/2005 | Valdez et al. | |
| 2005/0243993 A1* | 11/2005 | McKinzie et al. | 379/355.04 |
| 2006/0093120 A1 | 5/2006 | Thorpe et al. | |
| 2006/0095575 A1 | 5/2006 | Sureka et al. | |
| 2006/0168140 A1 | 7/2006 | Inoue et al. | |
| 2006/0276179 A1 | 12/2006 | Ghaffari et al. | |
| 2006/0277213 A1 | 12/2006 | Robertson et al. | |
| 2007/0021111 A1 | 1/2007 | Celik | |
| 2009/0060155 A1 | 3/2009 | Chingon et al. | |

FOREIGN PATENT DOCUMENTS

| | | |
|---|---|---|
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6- 113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 6/1996 |
| JP | 08-181763 | 7/1996 |
| JP | 08-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002-057807 | 2/2002 |
| JP | 2002-094696 | 3/2002 |
| JP | 2001-156921 | 8/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 10110942 | 9/2002 |
| JP | 2002-300290 | 10/2002 |
| JP | 2002-300306 | 10/2002 |
| WO | WO-95/12948 | 5/1995 |
| WO | WO-96/14704 | 5/1996 |

| | | |
|---|---|---|
| WO | WO-97/20423 | 6/1997 |
| WO | WO-97/033421 | 9/1997 |
| WO | WO-98/02007 | 6/1998 |
| WO | 99/38309 | 7/1999 |
| WO | WO-00/45557 | 8/2000 |
| WO | WO-00/60837 | 10/2000 |
| WO | WO-00/64133 | 10/2000 |
| WO | WO01/11586 | 2/2001 |
| WO | WO 01/11586 A1 | 2/2001 |
| WO | WO-01/22251 | 3/2001 |
| WO | WO 01/35621 | 5/2001 |
| WO | WO-01/52513 | 7/2001 |
| WO | WO 01/89212 | 11/2001 |
| WO | WO-02/25907 | 3/2002 |
| WO | WO-02/43338 | 5/2002 |

OTHER PUBLICATIONS

Komowski, J., "Wildfire at Your Back and Call-A Voice-Activated Telephone Assistant That Minds You and Your Messages", http://www.lacba.org/lalawyer/techwildfire.html, printed Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

"MP3 Recorder Download—MP3 Recorder—Record Audio Stream to MP3 or WAV," 2002 http://www.mp3-recorder.net.

"FAQ Premium Home Answer" eVoice, http://content.evoice.com/wcs/signUp/FAQ_premHA_s01.htm. Submitted on Jul. 20, 2004.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html. Submitted on Jul. 20, 2004.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(Oct. 20, 2002).htm.

"Macromedia SoundEdit 16 Support Center-Working with Other Programs, What is Shockwave Audio Streaming?" http://www.macromedia.com/support/soundedit/how/shock/whatis.html. Submitted on Jul. 20, 2004.

"Chapter 3: Overview," last updated Dec. 2, 1999, http://service.real.com/help/library/guides/g270/htmfiles/overview.htm.

U.S. Appl. No. 09/828,679, filed Apr. 6, 2001, Reding et al.

U.S. Appl. No. 09/785,223, filed Feb. 16, 2001, Swingle et al.

"How Internet Radio Works," Howstuffworks, http://computer.howstuffworks.com/internet-radio.htm/printable, Submitted on Jul. 20, 2004.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.orq/editions/edition5/synch_collab.asp, Submitted on Jul. 20, 2004.

"NetMeeting101," http://www.meetingbywire.com/NetMeeting101.htm, Submitted on Jul. 20, 2004.

"NetMeeting102," http://www.meetingbywire.com/NetMeeting102.htm, Submitted on Jul. 20, 2004.

"Instructions on Application Sharing and Data Collaboration," VCON Escort and Cruiser, http://www.vide.gatech.edu/docs/share/, Submitted on Jul. 20, 2004.

"Instructions on Multipoint Application Sharing and Data Collaboration," VCON Escort and Cruiser with the RadVision MCU, http://www.vide.gatech.edu/docs/multi-share/ Submitted on Jul. 20, 2004.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

Business Solutions/Professional, http://www.accessline.com/business_sol/bs_professional_body.html, Submitted on Jul. 20, 2004.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging", M. Day, et al. Fujitsu, Feb. 2000, Network Working Group, Request for Comments 2778.

"MP3 Recorder Download—MP3 Recorder—Record Audio Stream to MP3 or WAV," 2002, http://www.mp3-recorder.net.

"FAQ Premium Home Answer" eVoice, http://content.evoice.com/wcs/siqnUp/FAQ_premHA_s01.htm, Submitted on Feb. 8, 2006.

"Audio Digitizing Process," TalkBank, http://www.talkbank.org/da/audiodig.html, submitted on Feb. 8, 2006.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?", http://www.macromedia.com/support/soundedit/how/shock/whatis.html, Submitted on Feb. 8, 2006.

"How Internet Radio Works," Howstuffworks, http://computer.howstuffworks.com/internet-radio.htm/printable, Submitted on Feb. 8, 2006.

"Real-Time Collaboration Integration in the Portal," T. Odenwald, SAP Design Guild, http://www.sapdesignguild.org/editions/edition5/synch_collab.asp, Submitted on Feb. 8, 2006.

"NetMeeting101," http://www.meetingbywire.com/NetMeeting101.htm, Submitted on Feb. 8, 2006.

"NetMeeting102," http://www.meetingbywire.com/NetMeeting102.htm, Submitted on Feb. 8, 2006.

"Instructions on Application Sharing and Data Collaboration," VCON Escort and Cruiser, http://www.vide.gatech.edu/docs/share/, Submitted on Feb. 8, 2006.

"Instructions on Multipoint Application Sharing and Data Collaboration," VCON Escort and Cruiser with the RadVision MCU, http://www.vide.gatech.edu/docs/multi-share/, Submitted Feb. 8, 2006.

Business Solutions/Professional, http://www.accessline.com/business sol/bs_professional_body.html, Submitted on Feb. 8, 2006.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, 2003-4, Submitted on Feb. 8, 2006.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

http://replay.waybackmachine.org/20020207142936/http://www.clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10.1.1.33.4361, 1998, 1-14.

Gessler, et al., "PDAs as mobile WWW browers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu.edu/viewdoc/summary?doi=1 0.1.1.40,624, 1999, 1-15.

Lauff, et al., "Multimedia Client Implementation on Personal Digital Assistants", http://citeseer.ist.psu.edu/viewdoc/summary?doi=1 0.1.1.6.6059, 1997, 1-15.

* cited by examiner

METHODS AND SYSTEMS FOR CONTACT MANAGEMENT

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/083,792, entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, all of which claim priority to U.S. Provisional Patent Application Nos. 60/272,122, 60/272,167, 60/275,667, 60/275,719, 60/275,020, 60/275,031, and 60/276,505, and all of which are expressly incorporated herein by reference in their entirety.

Applicants also claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002; U.S. patent application Ser. No. 10/720,661, entitled "METHODS AND SYSTEMS FOR CONFIGURING AND PROVIDING CONFERENCE CALLS"; U.S. patent application Ser. No. 10/720,859, entitled "METHODS AND SYSTEMS FOR CONFERENCE CALL BUFFERING"; U.S. patent application Ser. No. 10/721,009, entitled "METHODS AND SYSTEMS FOR COMPUTER ENHANCED CONFERENCE CALLING"; U.S. patent application Ser. No. 10/720,943, entitled "METHODS AND SYSTEMS FOR REMOTE CALL ESTABLISHMENT"; U.S. patent application Ser. No. 10/721,005, entitled "METHODS AND SYSTEMS FOR CALL MANAGEMENT WITH USER INTERVENTION"; U.S. patent application Ser. No. 10/720,868, entitled "METHODS AND SYSTEMS FOR DIRECTORY INFORMATION LOOKUP"; U.S. patent application Ser. No. 10/720,970, entitled "METHODS AND SYSTEMS FOR AUTOMATIC COMMUNICATION LINE MANAGEMENT BASED ON DEVICE LOCATION"; U.S. patent application Ser. No. 10/720,952, entitled "METHODS AND SYSTEMS FOR ADAPTIVE MESSAGE AND CALL NOTIFICATION"; U.S. patent application Ser. No. 10/720,870, entitled "METHODS AND SYSTEMS FOR A CALL LOG"; U.S. patent application Ser. No. 10/720,633, entitled "METHODS AND SYSTEMS FOR AUTOMATIC FORWARDING OF CALLS TO A PREFERRED DEVICE"; U.S. patent application Ser. No. 10/720,971, entitled "METHODS AND SYSTEMS FOR LINE MANAGEMENT"; U.S. patent application Ser. No. 10/720,920, entitled "METHODS AND SYSTEMS FOR NOTIFICATION OF CALL TO PHONE DEVICE"; U.S. patent application Ser. No. 10/720,825, entitled "METHODS AND SYSTEMS FOR SINGLE NUMBER TEXT MESSAGING"; U.S. patent application Ser. No. 10/720,944, entitled "METHODS AND SYSTEMS FOR MULTI-USER SELECTIVE NOTIFICATION"; U.S. patent application Ser. No. 10/720,933, entitled "METHODS AND SYSTEMS FOR CPN TRIGGERED COLLABORATION"; and U.S. patent application Ser. No. 10/720,938, entitled "METHODS AND SYSTEMS FOR PREEMPTIVE REJECTION OF CALLS," all of which are expressly incorporated herein by reference in their entirety.

FIELD OF THE INVENTION

The present invention generally relates to communication systems and, more specifically, to methods and systems for providing contact management services.

BACKGROUND OF THE INVENTION

A wide variety of means exist for communication between users. For example, a user may conduct phone calls via a home phone, work phone, and mobile phone. In addition, users may also communicate using devices such as PC's, PDA's, pagers, etc. using manners of communicating as email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

Further, call management is becoming increasingly difficult given the expanding array of available communication devices and services. Conventional communication systems provide users with limited contact management features. One common option in conventional systems is "Caller ID," which enables a receiving party to view a calling party's telephone number. Certain systems (e.g., digital cell phones) allow users to locally store phone numbers in a contact list, which is usually a FIFO or rolling list with limited storage capacity. In such systems, the user typically must perform an action to insert phone numbers in the contact list. For example, in a cell phone, the user must enter in phone numbers via a keypad and instruct the device to save the entered numbers. Certain systems may automatically store all outgoing and incoming calls in a rolling list as they are dialed and received; however, such systems typically provide limited FIFO storage and usually store only the numbers. Further, current systems do not allow users to retrieve contact information from a calling party number on demand and to add contact information to a contact list. Also, current communication systems do not enable users to add contacts to a contact list from several sources and devices (e.g., Caller-ID, bills, call history, cell phones, laptops, PDAs, J2ME phones, BREW phones, etc.).

Methods, systems, and articles of manufacture consistent with certain embodiments of the present invention are directed to obviating one or more of the issues set forth above.

SUMMARY OF THE INVENTION

Systems and methods consistent with principles of the present invention may provide contact management services.

Consistent with embodiments of the present invention, systems and methods may provide and maintain an address book for a user. In certain embodiments, contacts may be added to the address book from one or more sources, such as a CID display, a call history, and a billing/account statement.

Systems and methods consistent with the present may provide a notification to a user of an incoming call placed by a calling party and directed to a calling device associated with the user. For example, the user may be notified via a user terminal (e.g., laptop, cell phone, PDA, etc.) of a call directed to a landline telephone. Systems and methods may be provided for receiving a command, responsive to the notification, to add the calling party to an address book. In response to the received command, contact information associated with the calling party may obtained and added to the address book.

Consistent with embodiments of the present invention, systems and methods may provide a user with access to a contact source. Such a contact source may include listings that represent communications (e.g., calls) between the user and a second party. Systems and methods may receive a request to add the second party to an address book. In response to the request, contact information associated with the second party may be obtained and stored in the address book.

Consistent with embodiments of the present invention, systems and methods may be provided for receiving a request to add a contact to an address book, where the contact is a party with which the user communicated prior to making the request. Systems and methods may access a communications log associated with user and search the communications log for the contact. Contact information associated with the contact mat be obtained using information included in the communications log, and the obtained contact information may be stored in the address book.

Consistent with embodiments of the present invention, systems and methods may receive a command to add a party to an address book and obtain contact-related information associated with the party. The contact-related information may be added to the address book. Systems and methods may detect a change in the obtained contact-related information associated with the party and update the address book to reflect the change.

Both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification, illustrate exemplary embodiments of the invention and, together with the description, serve to explain principles of the invention. In the drawings.

DETAILED DESCRIPTION

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention. It is to be understood that other implementations may be utilized and that structural and method changes may be made without departing from the scope of present invention.

Figure 1:
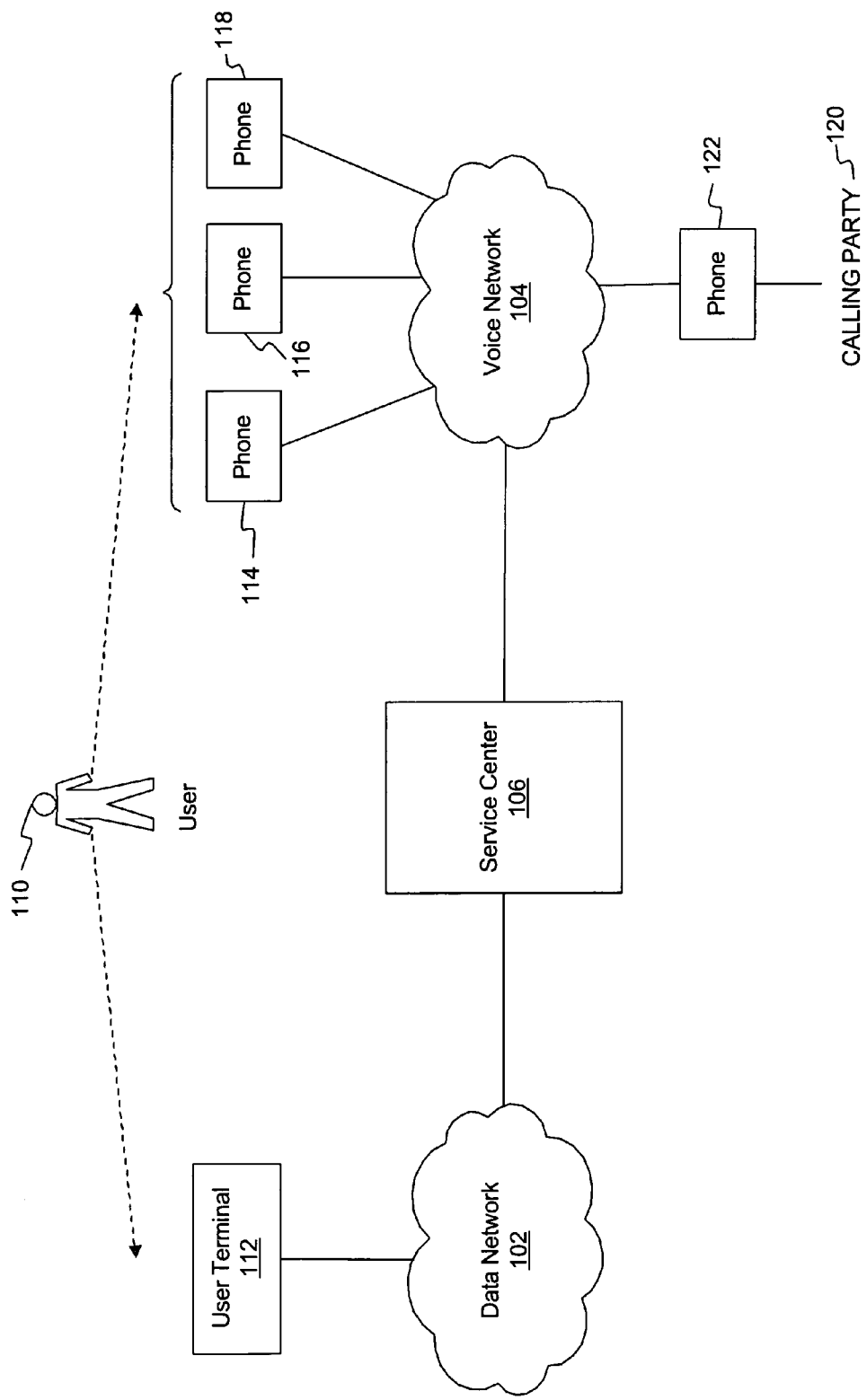
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both PSTN and VoIP technology consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104.

Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
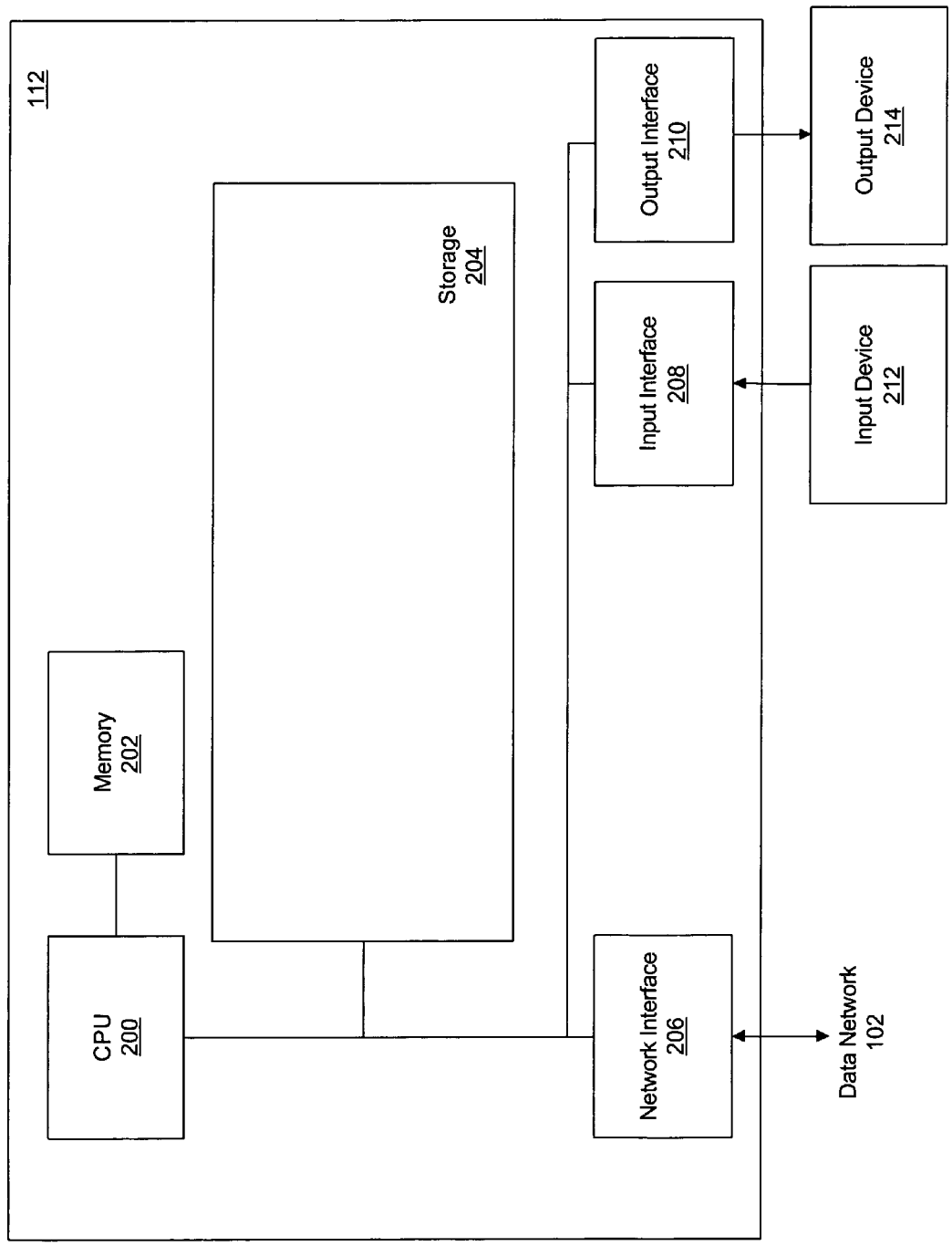
FIG. 2 is a diagram of an exemplary user terminal, consistent with the principals of the present invention.

FIG. 2 is a block diagram of a user terminal consistent with the present invention. User terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
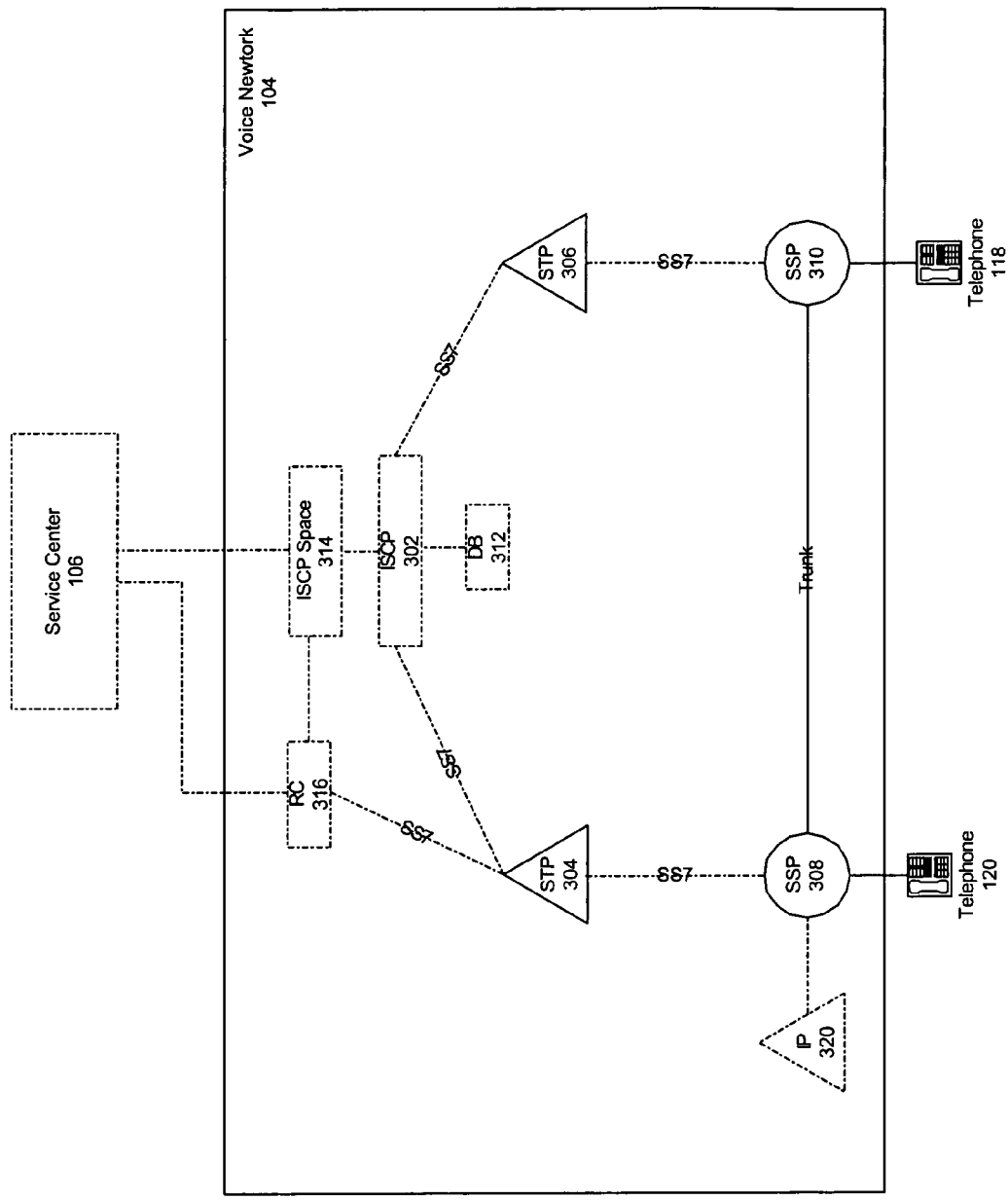
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (AAIS); or a multi-services platform (MSP). As an example, the eRC and MIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to ISCPs 302.

Additionally, voice network 104 may include one or more intelligent peripherals (IP). For example, in FIG. 4, an IP 320 is illustrated as being connected to SSP 308. These IPs may be used for providing services, such as voice mail services.

Figure 4:
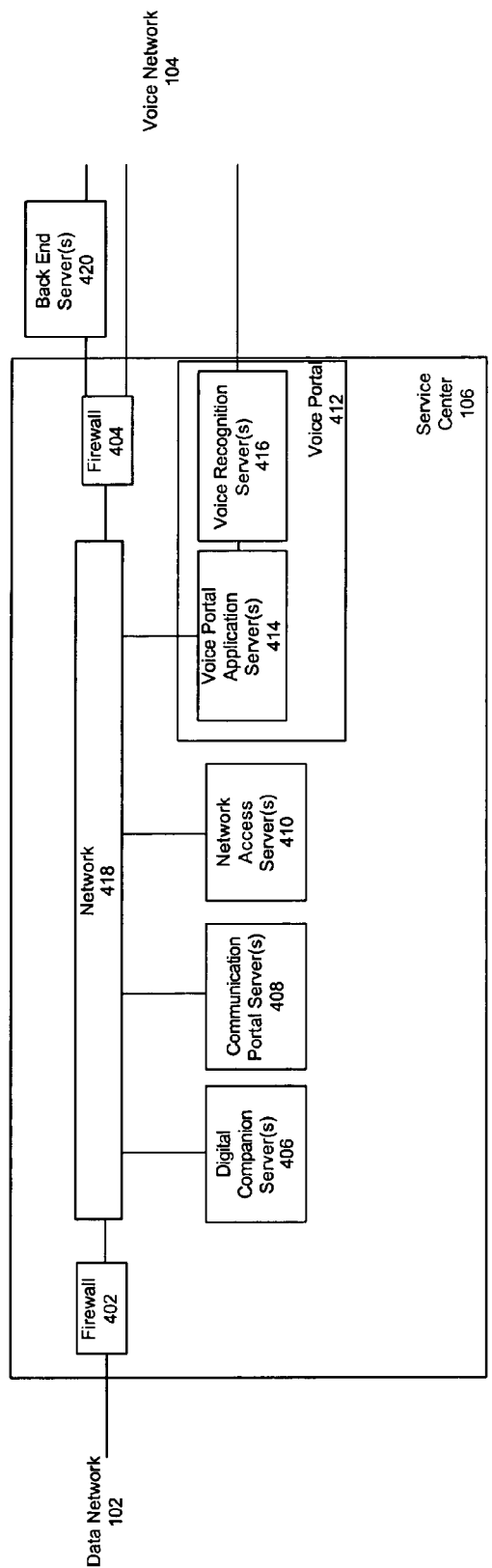
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any type of server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with embodiments of the present invention, methods and systems may leverage digital companion server 406 to perform contact management services.

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
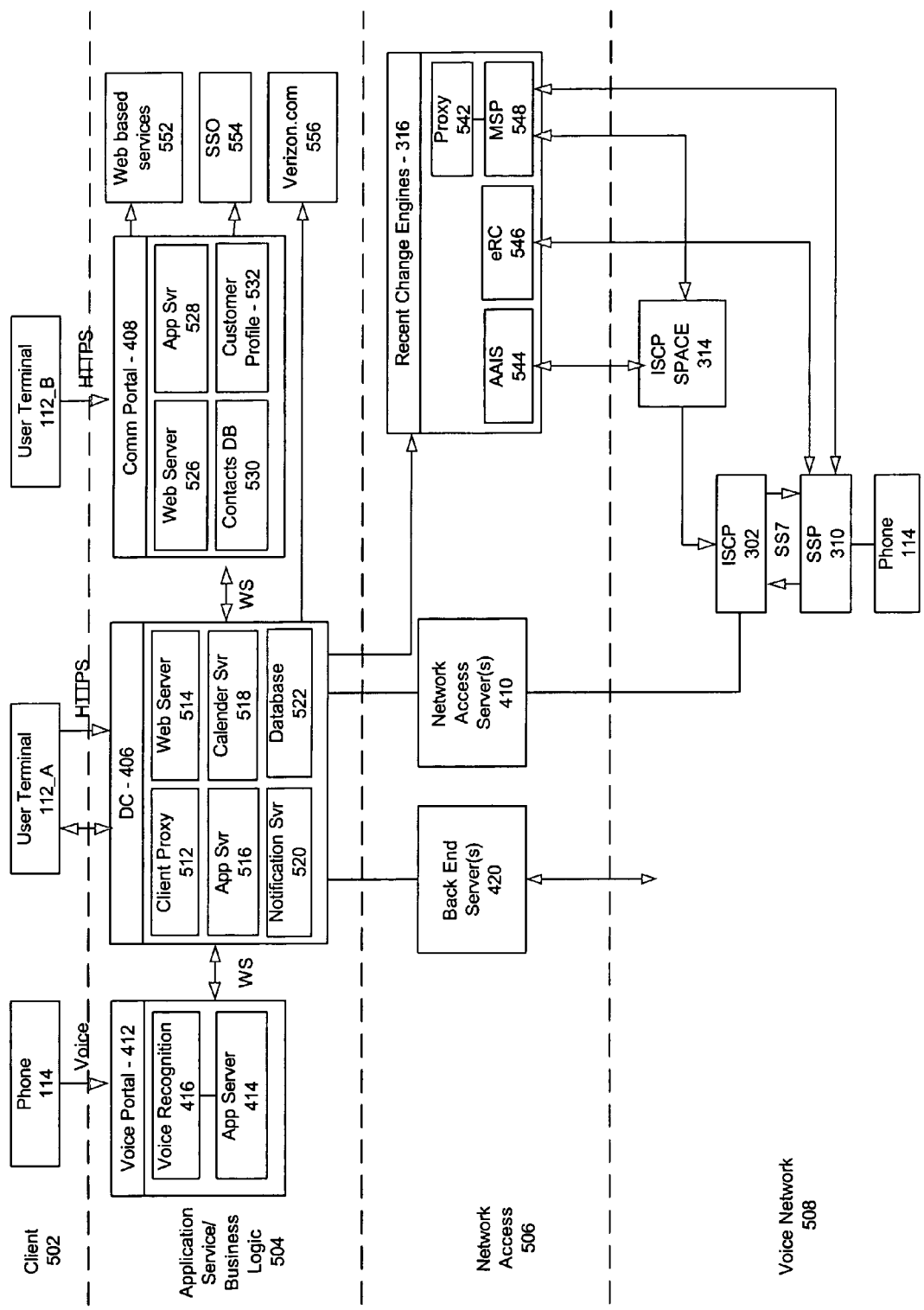
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with embodiments of the present invention, application server function 516 may facilitate one or more contact management functions.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any type of address book. For example, the user's address book may include the names, phone numbers, and addresses of people and/or organizations. These storage devices may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include the recent change engines 316, network access servers 410, and/or back end servers 420.

As discussed above, recent change engines 316 may be used to update switches and ISCP databases included in voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in the service center 106 and may provide the hardware and software for sending and receiving information to voice network 104 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing the service center 106 with a SMS gateway in voice network 104. This may be used, for example, to permit the customer to have SMS messages addressed to their home phone number directed to an SMS capable device of the users chosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane

508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may co-exist or be distributed among several geographically dispersed locations.

Consistent with embodiments of the present invention, methods and systems may perform contact management services. As used herein, the term "contact" refers to any individual and/or entity with which a user (e.g., user 110) is associated, has communicated, and/or desires to communicate. Non-limiting examples of "contacts" include acquaintances, friends, relatives, business, business associates, potential business associates, spouses, children, etc. In certain embodiments, contacts may include individuals and/or entities which initiate contact with a user (e.g., 110) via one or more communication devices (e.g., via telephones 114, 116, etc.), and the contacts may include individuals/entities previously unknown to the user prior to such contact. Contacts may also include individuals and/or entities with which the user initiates contact.

Consistent with principles of the present invention, contacts may be added to the address book in response to communications received by and/or initiated from several devices associated with a particular user. For example, calling and/or called parties associated with user's 110 cell phone, landline phone, facsimile, laptop, and/or PDA may be added to the address book.

Methods and systems consistent with the present invention may provide an address book or contact list facility and may enable contacts to be added to the address book from various contact sources. Additional details of such an address book/contact list facility are described below in connection with FIG. 6. As used herein, the term "contact source" refers to any resource from which a contact may be selected and/or obtained for addition to the address book. In certain embodiments, a "contact source" may include a compilation of data representing one or more communications between a user and other parties. Contact sources may include incoming call histories, outgoing call histories, account statements, billing statements, a CID display, e-mail logs, facsimile transmission logs, cell phone records, etc. In certain embodiments of the present invention, such contact sources may be accessible to the user, and the user may select contacts from such contact sources for addition to the address book. In addition, or as an alternative, contact sources may be accessible to one or more systems (e.g., service center 106), and such systems may access the sources to add contacts to the address book.

Consistent with embodiments of the present invention, adding a contact to the address book may involve inserting contact-related information associated with the particular contact in the address book. Consistent with embodiments of the present invention, contact-related information may include one or more of a name, home address, business address, home telephone number, business telephone number, cell phone number, instant messenger address, IP address, biometric information (e.g., fingerprints, voice prints, retinal scans, etc.) visual information (e.g., digital images, photographs, etc.), audio information, personal information (e.g., birth date, favorite movies, favorite songs, etc.), public records, credit reports, police records, driving records, banking statements, and contact-related information associated with relatives and/or friends. In certain embodiments, contact-related information may include information associated with, or retrieved via, one or more networks. Contact information may be retrieved or obtained from one or more systems, networks, and/or service providers associated with a particular user (e.g., service center 106).

In one embodiment of the present invention, contacts may be automatically added to the address book, with or without the user's input. For example, the address book may be periodically updated or dynamically updated in response to changes in contact-related information. In addition, or as an alternative, the user could cause a contact to be added to the address book. For example, user 110 could select a caller from a monthly billing statement or call history to add to the address book. Further, a user could specify a contact to add to the address book by for, example, inputting a name and/or number to user terminal 112. Methods and systems of the present invention may use the specified name or number to retrieve contact information that may be added to the address book.

Figure 6:
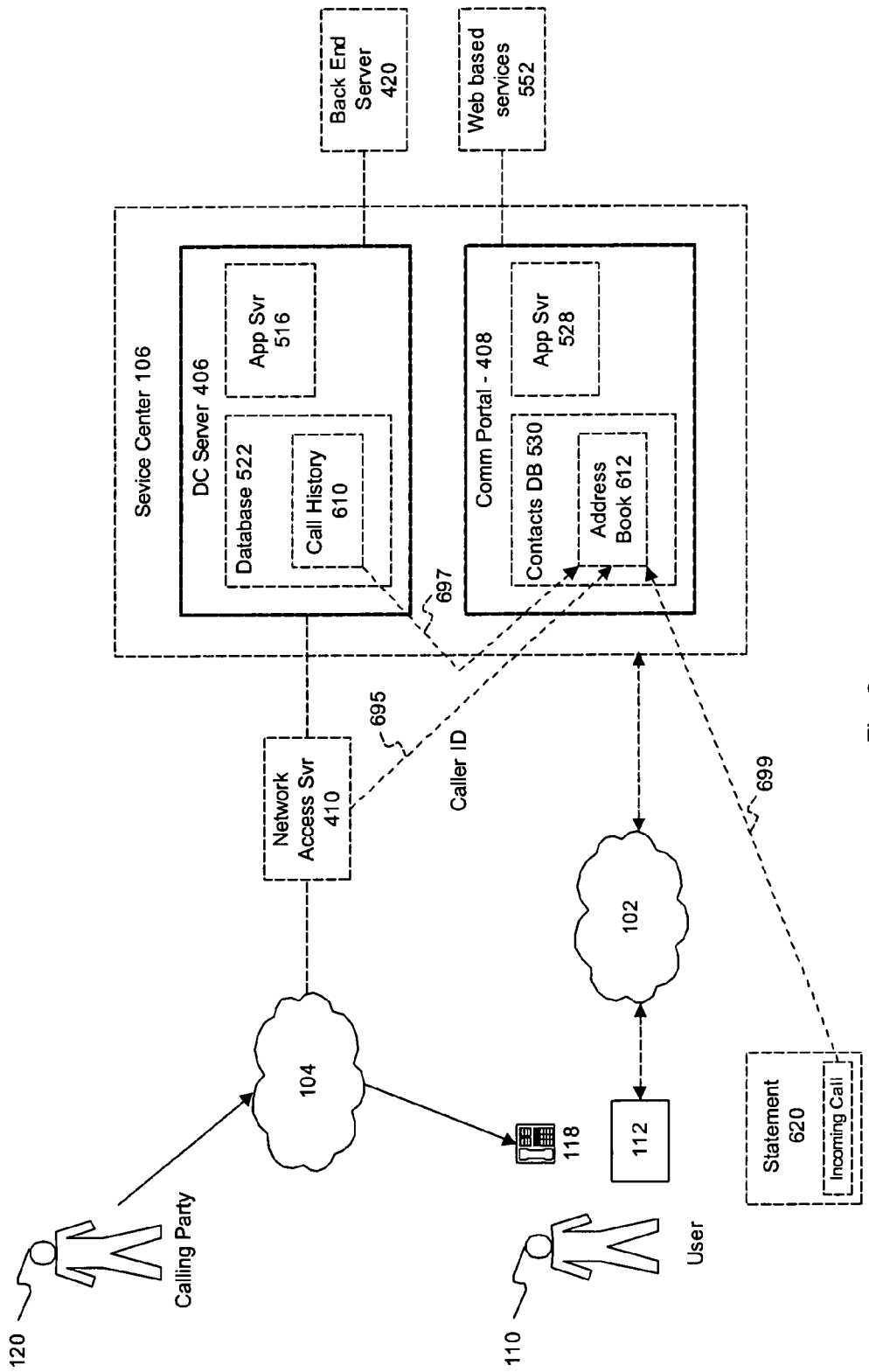
FIG. 6 is a diagram illustrating features and aspects consistent with certain embodiments of the present invention.

FIG. 6 diagrammatically illustrates an overview of contact management processes and features consistent with certain embodiments of the present invention. As illustrated, an address book 612 may be provided and maintained. Address book 612 may represent any system, device, and/or facility capable of electronically maintaining, managing, and/or providing access to contact-related information associated with contacts. Thus, the term "address" encompasses contact-related information. Address book 612 may be implemented by one or more software, hardware, and/or firmware elements. In certain embodiments, address book 612 may include a network-based service and/or database. Address book 612 may be implemented in a server coupled to a network. In one example, address book 612 may include a server-side Web service, which may be implemented using (and leverage) XML-over-HTTP and Microsoft .NET. In certain embodiments, address book 612 may be created and edited via application 528 in communications portal server 408 and, as illustrated in FIG. 6, located/maintained in contacts database 530. Address book 612 may be configured to store, manage, and provide access to information associated with contacts. User 110 may access address book 612 through user terminal 112 via a Graphical User Interface (GUI), in certain embodiments of the present invention. Consistent with principles of the present invention, application 516 in digital companion server 406 may enable user 110 to add contacts to address book 612.

Consistent with embodiments of the present invention, contacts may be added to address book 612 from one or more contact sources. For example, as depicted in FIG. 6, contacts may be added from a CID display (flow line 695), a call history (flow line 697), and/or a billing/account statement (flow line 699).

As illustrated in FIG. 6, user 110 may receive a telephone call from calling party 120 via, for example, telephone 118. In certain embodiments, network access server 410 and voice network 104 may be leveraged to obtain CID information associated with calling party 120. Such CID information may be displayed to the user (e.g., via telephone 118 and/or user terminal 112) and may be inserted in address book 612 (flow line 695). The CID information may inserted automatically and/or in response to a user command. For example, user 110 may view the CID display and select one or more displayed listings for addition to address book 612.

In certain embodiments, contacts may be added to address book 612 from call history 610. Call history 610 may be implemented via one or more data files and/or structures residing on (or distributed among) one or more storage devices. For example, as illustrated in FIG. 6, call history 610 may be stored via database function 522. Call history may include a listing of calls originating from or received by one or more devices associated with user 110 (e.g., cell phone, landline phone, facsimile, PDA, etc.). In certain embodiments, call history 610 may represent one or more "call logs." Methods and systems of the present invention may retrieve contact-related information associated with a listing in call history 610 and insert the retrieved contact information to address book 612. In certain implementations, call history 610 could include contact-related information associated with each listed call, and in such implementations, the contact-related information may be transferred from call history 610 to address book 612.

In addition, contacts may be added from billing/account statements, e.g., statement 620. Statement 620 represents a physical and/or electronic statement associated with user 110's account. In one embodiment, statement 620 may be generated and provided to user 110 via communication portal server 408 and user terminal 112. Consistent with embodiments of the present invention, call management methods and systems may add contacts to address book 612 from statement 620. For example, upon viewing statement 620 on user terminal 112, user 110 may input a command to server 406 (via user terminal 112) that causes contact information associated with a party listed on statement 620 to be obtained and inserted in address book 612.

Call management processes consistent with the present invention may leverage one or more systems included in or coupled to service center 106 to obtain contact-related information for parties. In certain embodiments, call management methods and systems may leverage one or more back end server(s) 420 to obtain contact information. As illustrated in FIG. 6, digital companion server 406 may be configured to interact with back end server 420. Back end server 420 may include hardware and/or software for interfacing service center 106 with voice network 104. Back end server 420 may be connected to service center 106 via a network (e.g., a corporate network), a direct connection, or in any other suitable manner. Further, back end server 420 may connect to one or more devices in voice network 104 by a network, a direct connection, or in any other suitable manner. Consistent with embodiments of the present invention, back end server 420 may include or be configured to operate as one or more RDA application servers. As such, back end server 420 may interface service center 106 with an RDA Gateway in voice network 104 and a Data Operations Center (DOC). Back end server 420 may facilitate RDA lookup processes, which may obtain contact-related information (e.g., name, address, etc.) associated with a party by way of a telephone number or other identifier associated with that party.

In certain embodiments, call management methods and systems may leverage one or more networks and/or Web-based services to obtain contact-related information. In such embodiments, communication portal server 408 may be configured to interact with Web-based services 552, which may provide web services, such as the Superpages Webpage. Application function 528 in server 408 may contact external services 552 to retrieve information, such as an address for a person listed in address book 612. This functionality may be especially useful if address book 612 includes only a name for a particular contact.

Although FIG. 6 illustrates a call originating from a calling party, contacts may be added to address book 612 when user 110 places an outgoing call to a called party. That is, in addition to adding contacts to address book 612 from received calls, contacts may be added from outgoing calls originating from user 110. In one embodiment, contacts associated with outgoing calls may be added to address book 612 via call history 610. In addition, or as an alternative, contacts associated with outgoing calls may be added to contact list when they are placed by user 110. For example, when user 110 places a call via telephone 118, user 110 may input a command to terminal 112 (or be prompted to respond to a notification by terminal 112), which causes the called party to be added to address book 612.

Further, although FIG. 6 illustrates a single user 110, a single calling party 120, and a single address book 612, it should be understood that any number of users, calling parties may be serviced by one or more service centers 106. In addition, a plurality of address books 612 may be provided for each of a plurality of users 110. Further, in one embodiment, a single address book facility may be configured to service a plurality of users 110.

Moreover, in addition to incoming and outing telephone calls, contacts may be added to address book 612 in response to other communications associated with user 110. For example, contacts may be added to address book 612 in response to incoming and/or outgoing facsimiles, e-mails, instant messages, voice mail messages, etc. associated with user 110.

In addition, contacts may be added to address book 612 automatically and/or on demand. That is, contact information associated with a called or calling party may be automatically added to address book 612 in response to an outbound or inbound call or may be added to address book 612 in response to a command from user 110. For example, server 406 may, in conjunction with server 408, automatically retrieve and add contact information associated with a called party or calling party to address book 612.

Consistent with embodiments of the present invention, methods and systems may dynamically and/or periodically update information included in address book 612. One or more components in, or coupled to, service center 106 (e.g., server 406 and/or 420) may monitor, and/or retrieve information from, various resources, such as communication devices, networks, etc. in order to update address book 612. In addition, or as an alternative, a particular address book 612 may interact with other address books 612 and may update to reflect information included in the other address books. Consistent with embodiments of the present invention, one or more agent networks or systems may be associated with address book 612, which may periodically or on demand cause address book 612 to update.

In one embodiment, address book 612 may self-update periodically (e.g., every 7 days) in order to refresh stored contact-related information. In addition, or as an alternative, contact-related information included in address book 612 may be refreshed dynamically, e.g., in response to changes in contact-related information associated with one or more contacts included in address book 612. Changes in contact-related information may be caused by the contact and/or by another party, and one or more components in, or coupled to, service center 106 may be configured to detect such changes. In certain embodiments, address book 612 may be automatically updated (e.g., by one or more components in service center 106) to reflect changes in contact-related information for a contact included in address book 612.

In certain embodiments, a plurality of address book 612 may be associated with a plurality of DC users 110, and each address book 612 may interact with other address books 612. Each address book 612 may be tailored to its respective user, and each user may control the information available to other address books 612. In alternative embodiments, a single address book 612 may service a plurality of users 110. In this fashion, each user 110 may be provided with a specific view of a larger body of available information included in address book 612. Each address book view may be tailored to its respective user 110, and each user 110 may specify specific information to make available to other address book views. In certain embodiments, each address book 612 or address book view may self-update to reflect changes in contact-related information in response to its respective user 110 logging in or accessing the address book or view.

Address book 612 may, in one configuration, update in response to a call received at one or more communication devices from a caller. If the caller is another DC user 110, then contact-related information may be retrieved from, for example, an address book 612 associated with that other user 110. For example, a first user 110 may send a photograph to a first address book 612 with which the first user is associated. When the first user 110 contacts a second user 110 (e.g., places a telephone call), a second address book 612 associated with the second user 110 may automatically update to include the photograph by retrieving the photograph from the first address book 612. Alternatively, the second user 110 may be notified of the change in contact-related information and prompted to indicate whether or not the second address book 612 should update to reflect the change.

In certain implementations of the present invention, user 110 may specify and alter the manner in which contacts are added to address book 612 via, for example, user terminal 112, which may interface with elements in server 406 and/or communication portal server 408. For example, user 110 may designate certain sources (e.g., history 610, statement 620, etc.) from which to obtain contacts. User 110 could also specify the manner in which contact information is obtained for contacts. In addition, user 110 could set parameters that cause contacts to be automatically added to address book 612 from one or more sources. In one embodiment, user 110 may set and change preferences/parameters via application function 516 and/or application function 528. In addition, user 110 may dynamically change the manner in which contacts are added to the contact list at any time.

Figure 7:
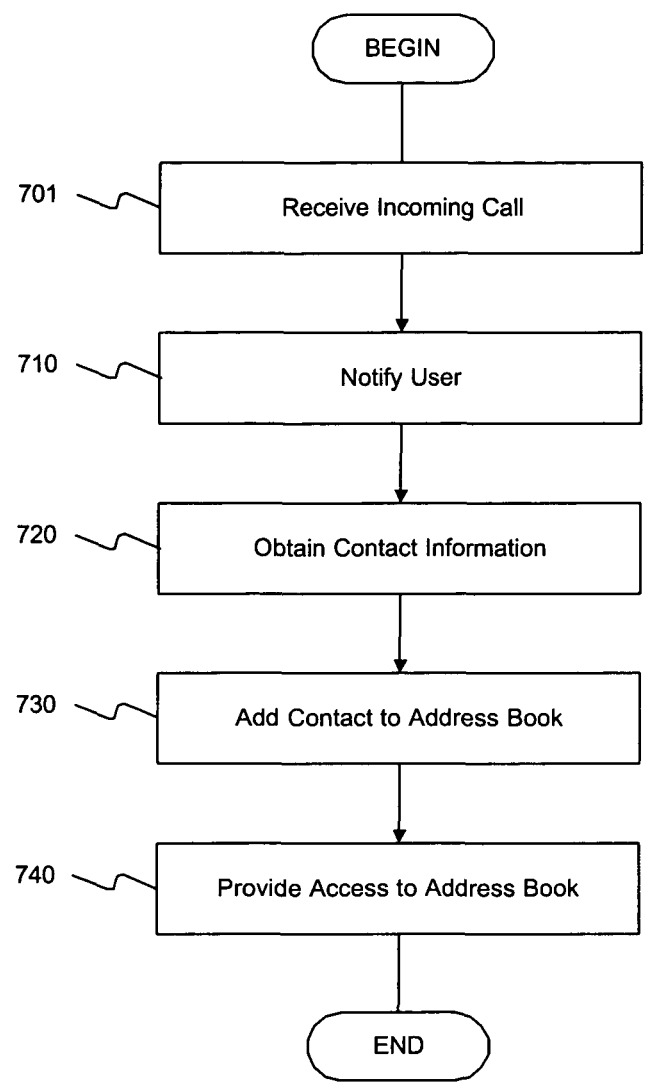
FIG. 7 is a flowchart depicting stages of an exemplary method consistent with certain embodiments of the present invention.

FIG. 7 is a flowchart depicting stages in an exemplary contact management process consistent with embodiments of the present invention. The illustrated process may begin when an incoming call is received (stage 701). For example, a call originating from calling party 120 and serviced by network 104 may be received via telephone 118 (FIG. 6). Consistent with embodiments of the present invention, methods and systems may notify user 110 of the incoming call (stage 710). In certain embodiments, methods and systems of the present invention may notify user 110 of the incoming call via user terminal 112. In such embodiments, notification server function 520 may send a notification to user terminal 112 that user 110 is presently receiving a call at telephone 118. Methods and systems of the present invention could, in alternative embodiments, notify user 110 of the incoming call via a CID display.

After an incoming call is received and the user is notified, contact information associated with the calling party (e.g., 120) may be obtained (stage 720). In the process of FIG. 7, obtaining contact information may include obtaining CID information. As explained above, network access servers 410 may include CID functionality for retrieving caller ID information from voice network 104. In certain embodiments, obtaining contact information may include obtaining contact information for calling party 120 using CID information. That is, CID information may be leveraged to obtain additional contact information for a contact. For example, digital companion server 406 and/or back end server 420 may use CID information (e.g., a telephone number) to retrieve contact information associated with calling party 120 (e.g., via RDA processes).

In one embodiment, contact information associated with the calling party may be obtained automatically when the incoming call is received. Alternatively, contact information for the calling party may be obtained in response to a user command. As mentioned above, notification server function 520 may send a notification to user terminal 112 that user 110 is presently receiving a phone call at telephone 118. In response to this notification, user 110 may input a command to user terminal 112 that causes the CID information associated with calling party 120 to be captured for insertion into address book 612.

In one embodiment, user 110 may be prompted by user terminal 112 (e.g., via server 406) to indicate whether a particular calling party should be added to an address book, and contact information may be obtained in response to an affirmative indication by user 110. User 110 may, in one example, be prompted each time an incoming call is received. In certain embodiments, user 110 could input one or more commands to user terminal 112 in order to preset address book preferences. For example, user 110 could input commands to user terminal 112 that cause calling parties associated with incoming calls to be added to address book 612 automatically. User 110 could also set filtering options that cause certain incoming calls to be added to address book 612 and others to be excluded. Such filtering could be based on telephone numbers, locations, devices, names, etc.

After contact information for the calling party (e.g., 120) is obtained, the contact (i.e., the calling party) may be added to address book 612 (stage 730). In the process of FIG. 7, adding contact information to the address book may include inserting the CID information in address book 612. Consistent with embodiments of the present invention, methods and systems may insert the CID information retrieved by network access servers 410 into address book 612, which may be located in contacts database 530 of communications portal server 408. In one example, the CID information may be inserted in address book 612 via application function 528 and/or application function 516. In certain embodiments, adding a contact to address book 612 may involve determining whether the contact (i.e., the calling party) already exists in address book 612. Methods and systems of the present invention may determine whether a particular contact represents a new contact or one that was previously entered in address book 612. Application function 516 and/or application function 528 may perform such a determination. If the contact is found in address book 612 (i.e., the contact is not a new contact), the contact may not be added. In certain embodiments, however, user 110 may be prompted (e.g., via user terminal 112) to indicate whether contact information corresponding to the selected contact found in address book 612 should be overwritten with the obtained contact information. If the contact represents a new contact, a new contact entry may be created and the obtained contact information associated with the contact may be added to address book 612, thereby adding the new contact to the address book. In certain embodiments, user 110 could be notified via user terminal 112 of additions to the address book.

In addition, the contact (i.e., calling party 120) may be added to address book 612, even if the contact is not new, if the obtained contact information is different from the information found in address book 612. In such a case, user 110 may be prompted (e.g., via user terminal 112) to indicate whether the contact information in address book 612 should be overwritten with the obtained contact information.

Consistent with certain embodiments of the present invention, contacts may be added to address book 612 in response to user instructions. For example, after the contact information is obtained (stage 720), the obtained information may be presented to user 110. User 110 may then be prompted to indicated whether the presented information should be inserted in address book 612. In some instances, the obtained contact information may include multiple listings (e.g., multiple addresses) for a contact. In such instances, the listings may be presented to user 110, and user 110 may select one or more of the listings to add to address book 612.

After adding the contact to address book 612, methods and systems of the present invention may provide user 112 with access to the added information in address book 612 (stage 740). In certain embodiments, user 110 may access address book 612 via user terminal 112 and digital companion server 406 (e.g., application function 516). Providing access to address book 612 may, for example, include visually, audibly, and/or physically presenting information associated with address book 612 to user 110.

Figure 8:
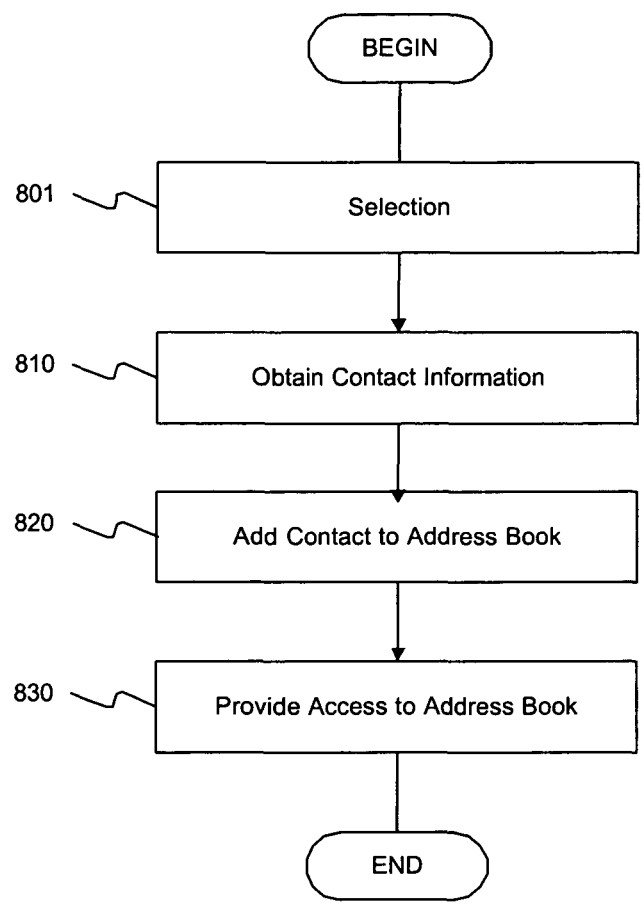
FIG. 8 is a flowchart depicting stages of an exemplary method consistent with certain embodiments of the present invention.

FIG. 8 is a flowchart depicting stages in another exemplary contact management process consistent with embodiments of the present invention. The illustrated process may begin when a contact is selected (stage 801) to be added to address book 612 (FIG. 6). In one embodiment of the present invention, a contact may be selected by way of user 110 inputting information (e.g., a telephone number) directly to user terminal 112 and requesting that the party associated with the number be added as a contact. In addition, or as an alternative, user 110 may select a contact from a contact source, e.g., call history 610, statement 120, etc. User 110 may, in one embodiment, make such a selection via user terminal 112. For example, user 110 may view statement 620 (provided by communication portal server 408) via user terminal 112 and select a particular listing from statement 620 by inputting one or more commands to user terminal 112. As an example, user 110 may select an incoming call from calling party 120 listed in statement 620. In such a case, calling party 120 represents a contact that user 612 desires to add to address book 612. In another example, user 110 may view (e.g., via user terminal 112) call history 610 located in database 522 of server 406. User 110 may then select a particular listing from call history 610, e.g., a particular outbound call listed in call history 610. Listings or entries selected by user 110 from either call history 610 or statement 620 may, in one configuration, be in the form of a telephone number. Consistent with embodiments of the present invention, the selection may be transmitted from user terminal 112 to one or more elements in service center 106, such as application function 516 in server 406.

Consistent with principles of the present invention, contact information may be obtained based on, and in response to, the selection (stage 810). In certain embodiments, one or more elements in service center 106 may obtain contact information in response to the selection. In one such embodiment, the listing selected by the user (stage 801) may include a telephone number, and server 406 in conjunction with back end server 420 may perform RDA processes to obtain contact information associated with that number. Referring to the above example in which calling party 120 represents the contact, contact information for calling party 120 may be obtained using a telephone number associated with calling party 120. In addition, or as an alternative, server 408 may leverage web based services 552 to obtain contact information associated with a particular number selected by user 110. Further, in certain configurations, server 406 may leverage network access server 410 to obtain contact information associated with the user selection.

In one configuration, call history 610 may include contact information (e.g., name, address, etc.) for each entry. For example, call history 610 may list incoming and/or outgoing calls and contact information corresponding to the parties associated with those calls. In such a case, one or more elements in service center 106 (e.g., application function 516) may obtain contact information (stage 810) by retrieving the contact information from call history 610.

Upon obtaining contact information for the selected contact (e.g., calling party 120), the contact may be added to address book 612 (stage 820). Consistent with embodiments of the present invention, the obtained contact information may be inserted in address book 612 via application function 528 and/or application function 516. Processes represented by stage 820 may be consistent with one or more processes represented by stage 730 of FIG. 7.

After the selected contact is added to address book 612, access to the added contact may be provided to user 110 (stage 830). Stage 830 may represent processes that are consistent with one or more processes represented by stage 740 of FIG. 7.

Figure 9:
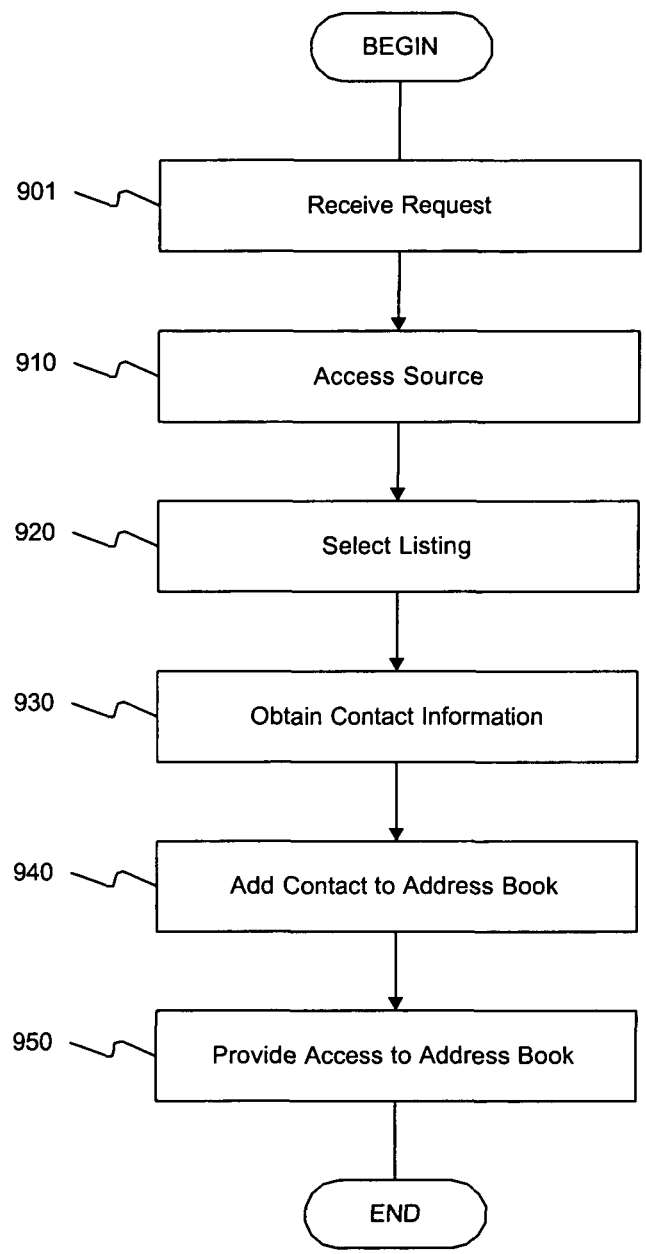
FIG. 9 is a flowchart depicting stages of an exemplary method consistent with certain embodiments of the present invention.

FIG. 9 is a flowchart depicting stages in another exemplary contact management process consistent with embodiments of the present invention. The illustrated process may begin when a request is received (stage 901) to add one or more contacts to address book 612 (FIG. 6). Consistent with embodiments of the present invention, user 110 may initiate such a request by inputting one or more commands to user terminal 112. User terminal 112 may then forward the request to one or more elements within service center 106 (e.g., server 406) for processing. In one example, user 110 may request that a particular call, or group of calls, be added to address book 612. User 110, may for instance, input commands to user terminal 112 that request that all incoming calls received on a particular day and via a particular device (e.g., telephone 118) be added. User 110 could also request that future incoming/outgoing calls received and/or placed via one or more devices be added to address book 612. In alternative embodiments, user 110 could input a telephone number directly to user terminal 110 and request that the party associated with that number be added to address book 612.

In addition, or as an alternative, a request to add contacts may be initiated by one or more elements included in or coupled to service center 106, with or without user intervention and/or knowledge. For example, user terminal 112 may be configured to automatically send a request to service center 106, in response to calls, e-mails, facsimiles, etc. placed and/or received by user 110, that causes contacts to be added to address book 612. Also, user terminal 112 may be configured to periodically request that certain contacts be added to address book 612. As an example, user terminal 112 could request (e.g., on a monthly basis) that all calling parties associated with incoming calls received by telephone 118 be added to user 110's address book 612.

Upon receiving a request to add contacts to address book 612, one or more contact sources may be accessed (stage 910). In one example, application function 516 and/or application function 528 may access one or more contact sources (e.g., call history 610 and/or statement 620) based on the received request. For instance, call history 610 may be accessed in response to a request to add contacts based on previously placed outgoing calls made by user 110.

Upon accessing the appropriate contact source, the process of FIG. 9 may select a listing/entry from the contact source to add to address book 612 (stage 920). For example, application function 516 may select a particular group of calls from call history 610 based on the received request (stage 901). After the listings are selected, contact information may be obtained. In one embodiment, call history 610 may include contact information for each of its listings, and the contact information may obtained directly from call history 610. In addition, or as an alternative, CID systems, RDA processes, and web based services may be leverage to obtain contact information. Stage 930 may represent processes that are consistent with one or more processes represented by stages 720 and 810 of FIGS. 7 and 8.

After the contact information is obtained, it may be added to address book 612 (stage 940), thereby adding the contact(s) to address book 612. Consistent with embodiments of the present invention, access to the added contact may be provided to user 110 (stage 950). Stages 940 and 950 may represent processes that are consistent with one or more processes represented by stages 730, 740, 820 and 830 of FIGS. 7 and 8.

The steps illustrated in the flowcharts of FIGS. 7-9 are consistent with exemplary implementations of the instant invention. Further, it should be understood that the sequence of events described in FIGS. 7-9 are exemplary and not intended to be limiting. Thus, other method steps may be used, and even with the methods depicted in FIGS. 7-9, the particular order of events may vary without departing from the scope of the present invention. Moreover, certain steps may not be present and additional steps may be implemented in the processes illustrated in FIGS. 7-9. For example, the illustrated processes may include addition steps corresponding to user 110 setting preferences and/or parameters associated with aspects of contact management, e.g., preferences that specify the manner in which contacts are added to address book 612.

In addition, although the term "call" is used in connection with FIGS. 7-9, the processes represented by these figures are not limited to telephone or any other specific types of calls. As mentioned above, contacts may be added to address book 612 in response to communications received by and/or initiated from a plurality of varying devices associated with user 110. For example, source and/or destination parties associated with user's 110 cell phone, landline phone, facsimile, laptop, PDA, etc. may be added to address book 612.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed embodiment, implementation, or configuration. Thus, the true scope and spirit of the invention depends on the following claims.

What is claimed is:

1. A computer-implemented method for contact management comprising the steps implemented by one or more computers of:

maintaining an address book;

receiving, from a user, filter settings defining criteria for determining whether to add incoming calls to the address book, the filter settings received from the user specifying one or more telephone numbers, locations, devices, or names for which associated contact-related information is not added to the address book;

providing a notification, via a user terminal, of an incoming call initiated by a calling party and directed to a communication device;

determining whether the incoming call meets the criteria defined by the filter settings to be added to the address book; and obtaining contact-related information associated with the calling party in response to the received command and adding the obtained contact-related information to the address book, provided the incoming call meets the criteria defined by the filter settings to be added to the address book, wherein the filter settings are received from the user in advance of the incoming call.

2. The computer-implemented method of claim 1, wherein maintaining an address book comprises maintaining the address book in a server coupled to a network.

3. The computer-implemented method of claim 2, wherein maintaining an address book comprises maintaining an XML-over-HTTP web service in a database.

4. The computer-implemented method of claim 1, wherein the notification indicates a telephone number associated with the incoming call.

5. The computer-implemented method of claim 1, wherein obtaining contact-related information comprises obtaining at least one of a name, a home address, a business address, a facsimile number, an e-mail address, an instant messenger address, an IP address, a cell phone number, a landline telephone number, an image, an audio signal, or a public record associated with the calling party.

6. The computer-implemented method of claim 1, wherein obtaining contact-related information comprises obtaining the contact-related information based on a telephone number associated with the calling party.

7. The computer-implemented method of claim 1, wherein obtaining contact-related information comprises obtaining the contact-related information using a caller identification (CID) service.

8. A computer-implemented method for contact management comprising the steps implemented by one or more computers of:

maintaining an address book for a user;

receiving a command to add a party to the address book;

obtaining contact-related information associated with the party in response to the received command;

storing the obtained contact-related information in the address book;

generating a query to determine whether to update the address book, prior to updating the address book; and periodically updating the contact-related information stored in the address book based on an affirmative response to the query, independently of communications between the user and the party.

9. The computer-implemented method of claim 8, wherein maintaining an address book comprises maintaining the address book in a server coupled to a network.

10. The computer-implemented method of claim 9, wherein maintaining an address book comprises maintaining an XML-over-HTTP web service in a database.

11. The computer-implemented method of claim 8, wherein obtaining contact-related information comprises obtaining contact-related information from at least one network.

12. The computer-implemented method of claim 8, wherein obtaining contact-related information comprises obtaining at least one of a name, a home address, a business address, a facsimile number, an e-mail address, an instant messenger address, an IP address, a cell phone number, or a landline telephone number.

13. The computer-implemented method of claim 8, wherein obtaining contact-related information comprises obtaining at least one of an image, an audio signal, or a public record associated with the party.

14. The computer-implemented method of claim 8, further comprising detecting an addition to the obtained contact-related information.

15. The computer-implemented method of claim 8, further comprising detecting a change in the obtained contact-related information by receiving a message from a network indicating the change.

16. The computer-implemented method of claim 8, further comprising detecting the change in the obtained contact-related information in response to a call received from the party.

17. The computer-implemented method of claim 8, further comprising detecting a change in the obtained contact-related information by receiving a message from a second address book associated with the party.

18. The computer-implemented method of claim 8, further comprising detecting a change in the obtained contact-related information by searching a plurality of network-based resources.

19. The computer-implemented method of claim 18, wherein searching a plurality of network-based resources comprises periodically searching said resources.

20. The computer-implemented method of claim 8, wherein updating the address book to reflect the change in the contact-related information comprises automatically updating the address book without user intervention.

21. The computer-implemented method of claim 8 further comprising:
notifying the user of the change in the contact-related information.

22. The computer-implemented method of claim 21 further comprising:
updating the address book to reflect the change in the contact-related information in response to a command from the user to update the address book.

23. The computer-implemented method of claim 8 further comprising:
receiving instructions from the user that specify preferences for updating the address book.

24. The computer-implemented method of claim 23, wherein updating the address book to reflect the change in the contact-related information comprises updating the address book based on the preferences.

25. A non-transitory computer-readable storage medium encoded with instructions for causing a computer processor to perform a method, the method comprising:
maintaining an address book;
receiving, from a user, filter settings defining criteria for determining whether to add incoming calls to the address book, the filter settings received from the user specifying one or more telephone numbers, locations, devices, or names for which associated contact-related information is not added to the address book;
providing a notification, via a user terminal, of an incoming call initiated by a calling party and directed to a communication device;
determining whether the incoming call meets the criteria defined by the filter settings to be added to the address book; and
obtaining contact-related information associated with the calling party in response to the received command and adding the obtained contact-related information to the address book, provided the incoming call meets the criteria defined by the filter settings to be added to the address book,
wherein the filter settings are received from the user in advance of the incoming call.

26. The non-transitory computer-readable storage medium according to claim 25, wherein the filter settings specify at least one telephone number, at least one location, at least one device, and at least one name for which associated contact-related information is not added to the address book.

27. A system comprising at least one server computer configured to:
maintain an address book;
receive, from a user, filter settings defining criteria for determining whether to add incoming calls to the address book, the filter settings received from the user specifying one or more telephone numbers, locations, devices, or names for which associated contact-related information is not added to the address book;
provide a notification, via a user terminal, of an incoming call initiated by a calling party and directed to a communication device;
determine whether the incoming call meets the criteria defined by the filter settings to be added to the address book; and
obtain contact-related information associated with the calling party in response to the received command and adding the obtained contact-related information to the address book, provided the incoming call meets the criteria defined by the filter settings to be added to the address book,
wherein the filter settings are received from the user in advance of the incoming call.

28. The system according to claim 27, wherein the filter settings specify at least one telephone number, at least one location, at least one device, and at least one name for which associated contact-related information is not added to the address book.

29. A non-transitory computer-readable storage medium encoded with instructions for causing a computer processor to perform a method, the method comprising:
maintaining an address book for a user;
receiving a command to add a party to the address book;
obtaining contact-related information associated with the party in response to the received command;
storing the obtained contact-related information in the address book;
generating a query to determine whether to update the address book, prior to updating the address book; and
periodically updating the contact-related information stored in the address book based on an affirmative response to the query, independently of communications between the user and the party.

30. The non-transitory computer-readable storage medium according to claim 29, wherein periodically updating comprises refreshing the contact-related information stored in the address book at fixed intervals of time.

31. The non-transitory computer-readable storage medium according to claim 30, further comprising updating the address book to reflect contact-related information included in one or more other address books.

32. A system comprising at least one server computer configured to:
   maintain an address book for a user;
   receive a command to add a party to the address book;
   obtain contact-related information associated with the party in response to the received command;
   store the obtained contact-related information in the address book; and
   periodically update the contact-related information stored in the address book based on an affirmative response to an update query, independently of communications between the user and the party.

33. The system according to claim 32, wherein periodically updating comprises refreshing the contact-related information stored in the address book at fixed intervals of time.

34. The system according to claim 32, wherein the at least one server computer is further configured to update the address book to reflect contact-related information included in one or more other address books.

* * * * *